(12) United States Patent
Dantlgraber et al.

(10) Patent No.: US 7,537,026 B2
(45) Date of Patent: May 26, 2009

(54) ON-OFF VALVE

(75) Inventors: Jörg Dantlgraber, Lohr (DE); Heino Försterling, Lohr (DE); Rudolf Scheidl, Erlauf (AT); Bernd Winkler, Linz (AT)

(73) Assignee: Bosch Rexroth AG, Stuttgart (DE)

( * ) Notice: Subject to any disclaimer, the term of this patent is extended or adjusted under 35 U.S.C. 154(b) by 202 days.

(21) Appl. No.: 11/587,622

(22) PCT Filed: Apr. 5, 2005

(86) PCT No.: PCT/EP2005/003572

§ 371 (c)(1),
(2), (4) Date: Jan. 18, 2007

(87) PCT Pub. No.: WO2005/108838

PCT Pub. Date: Nov. 17, 2005

(65) Prior Publication Data

US 2008/0041469 A1    Feb. 21, 2008

(30) Foreign Application Priority Data

May 4, 2004  (DE) .................. 10 2004 022 225
Oct. 21, 2004 (DE) .................. 10 2004 051 368

(51) Int. Cl.
*F16K 11/00* (2006.01)

(52) U.S. Cl. ................ 137/625.34; 137/625.48; 251/367

(58) Field of Classification Search ............ 137/625.33, 137/625.37, 625.48; 251/367
See application file for complete search history.

(56) References Cited

U.S. PATENT DOCUMENTS

| 1,712,245 | A | * | 5/1929 | Blyston | 137/625.3 |
| 1,938,943 | A | * | 12/1933 | Terry | 137/625.38 |
| 2,369,242 | A | * | 2/1945 | Lawler | 137/625.38 |
| 2,671,632 | A | * | 3/1954 | Palmer | 137/625.37 |
| 2,875,782 | A | * | 3/1959 | Lee | 137/625.33 |
| 3,719,199 | A | * | 3/1973 | Mentink | 137/269 |
| 3,730,479 | A | * | 5/1973 | Baumann | 137/625.34 |
| 3,952,775 | A | | 4/1976 | Ogata | |
| 4,314,585 | A | | 2/1982 | Nishimiya et al. | |
| 5,887,621 | A | * | 3/1999 | Doll | 137/625.38 |

FOREIGN PATENT DOCUMENTS

| DE | 678 978 | 7/1939 |
| DE | 41 29 755 A1 | 3/1993 |
| GB | 1134216 | 11/1968 |
| GB | 1155740 | 6/1969 |

* cited by examiner

*Primary Examiner*—John Fox
(74) *Attorney, Agent, or Firm*—Oliff & Berridge, PLC (57) ABSTRACT

An on-off valve is disclosed, especially a fast-acting on-off valve, wherein a plunger is pretensioned in a base position. The plunger has a plurality of parallel control edges via which a plurality of sectional opening cross-sections, arranged in parallel in a hydraulic manner, can be jointly actuated to open or close when the valve is switched.

16 Claims, 6 Drawing Sheets

ON-OFF VALVE

The invention relates to an on-off valve in accordance with the preamble of claim 1.

On-off valves are frequently directly controlled 2/2 directional control valves in a seat or slide design, wherein a plunger is pretensioned in a base position and is adapted to be displaced into a switching position by means of a solenoid. If by on-off valves of such type relatively large pressure medium volume flows (100 l/min with a pressure difference of 5 bar) are to be switched, large nominal widths are required. By virtue of the large nominal widths also the plungers/slides of such conventional on-off valves have to be comparatively large with a considerable mass. In some applications, for instance in mobile hydraulics, it is necessary to switch these on-off valves very quickly (switching times in the range of 1 ms), wherein the required flow may be up to several 100 liters per minute (100 l/min).

These dynamics cannot be achieved by conventional on-off valves inter alia because of the high inductivity of the solenoids required with said nominal parameters and the relatively large mass of the plunger. It is another drawback of conventional on-off valves that they are comparatively expensive especially with large nominal widths.

Compared to this, the object underlying the invention is to provide an on-off valve which permits a quick switch-over even of large pressure medium volume flows by way of a simple device.

This object is achieved by an on-off valve comprising the features of claim 1.

In accordance with the invention, the on-off valve comprises a plunger having a plurality of parallel control edges each of which delimits a sectional opening cross-section by a case-fixed control edge. That is to say, according to the invention in the open position of the on-off valve the pressure medium volume flow is divided into several partial volume flows each of which flows through one of the sectional opening cross-sections actuated to be open. By dividing the pressure medium volume flow via plural sectional opening cross-sections switched in parallel the on-off valve can be designed to have substantially smaller sleeve diameters than conventional on-off valves. The diameter of the plunger of the on-off valve is correspondingly smaller than in conventional solutions so that by far better dynamics can be attained by virtue of the reduced mass and the smaller solenoid required and the switching times are reduced to a fraction vis-à-vis conventional solutions. Due to the sectional opening cross-sections switched in parallel, the on-off valve according to the invention is somewhat longer than a conventional on-off valve, to be sure, but this drawback is eliminated by far by the reduction of the plunger diameter and the related more compact valve housing dimensions. The solution according to the invention can also be manufactured in a considerably cheaper way than conventional on-off valves due to the compact modular design.

Basically the on-off valve can be manufactured in a seat or slide design, however the latter construction is preferred in the invention.

The respective case-fixed control edge delimiting the sectional opening cross-section jointly with the parallel control edge of the plunger is formed on a circumferential sealing land of the casing.

In an especially preferred variant of the invention a valve sleeve of the casing receiving the plunger is composed of a plurality of disks. Each of the disks supports one of the sealing lands and has at least one pressure medium conduit which is adjacent to the sealing land and opens in a disk chamber encompassed by the disk.

In such a design it is particularly preferred when the pressure medium conduits of adjacent disks are alternately connected to the first or the second port of the on-off valve in a hydraulic manner.

The pressure loss inside the disks can be minimized when two respective pressure medium conduits radially open into the disk chamber on both sides. In a concrete embodiment three pairs of pressure medium conduits are provided, wherein one pair extends diagonally across the disk, while the two other pairs extend laterally offset with respect thereto.

The ducting in the on-off valve according to the invention is further simplified when four—preferably circular—recesses which are offset by 90° with respect to each other are formed at the outer circumference of the disk. The pressure conduits open at least in one of the recesses. In the assembled state the recesses of the disks arranged in series form respective junction conduits between the pressure fluid conduits and the ports of the on-off valve.

In the afore-described embodiment it is preferred when the pressure medium conduits open in two respective diametrally disposed recesses.

In an embodiment having an especially simple structure all disks are identical in construction, wherein adjacent disks are mounted offset by 90° with respect to each other so that the one disk subset can be easily connected to the first port and the subset arranged offset thereto can be connected to the second port in an equally simple manner.

The casing of the on-off valve includes a mounting bush in which the valve sleeve consisting of valve disks is inserted. Plural radial connecting bores, each of which is hydraulically connected to one of the ports and opens in one of the junction conduits joining the pressure medium conduits of the disks, pass through a shell of the mounting bush.

For reducing or preventing a pulsation or cavitations or for decoupling switching shocks reservoirs or other appropriate elements can be connected ahead of or behind the on-off valve. In a variant of the invention the casing is provided with plural recesses formed outside the mounting bush in which such reservoirs or the like can be inserted.

In another embodiment of an on-off valve casing pressure medium is supplied and discharged via a head plate of the casing.

The sealing lands formed in the disks are preferably formed to have inclined surfaces connected to the sealing faces. This variant permits to design the sealing lands in a very thin-walled manner, wherein even in the case of high working pressures no deformations occur which might entail sticking of the plunger. Due to the small width of the sealing lands the disks can be very thin so that the on-off valve requires a short building space despite the plurality of parallel control edges connected in series. Since this geometry of the sealing lands is the subject matter of an independent parallel application, further explanations can be dispensed with.

The on-off valve is preferably actuated by means of a magnet. The use of a fast acting flat armature magnet acting upon the plunger via a lever transmission is especially preferred. Said lever transmission is in the form of a solid-state joint in a preferred embodiment of the invention.

In a particularly preferred embodiment of the invention six disks are arranged in series so that the pressure medium volume flow is guided via three sectional opening cross-sections. Of course, the on-off valve can also have more or fewer disks.

Other advantageous further developments of the invention are the subject matter of further subclaims.

Hereinafter a preferred embodiment of the invention is illustrated in detail by way of schematic drawings, in which.

Figure 1:
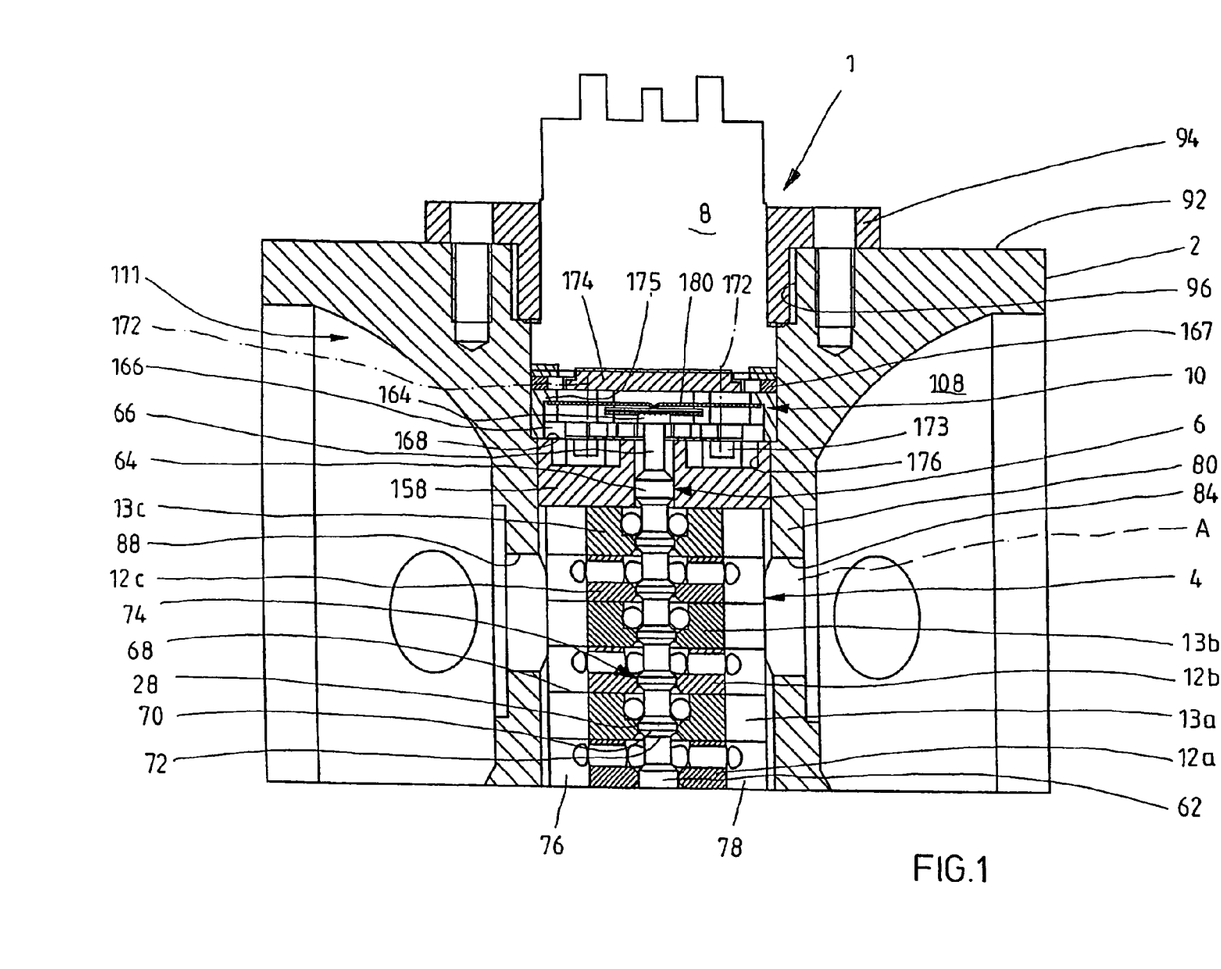
FIG. 1 shows a longitudinal section across a first embodiment of a fast-acting on-off valve.

In FIG. 1 a longitudinal section across a first embodiment of a fast-acting on-off valve 1 is represented. The fast-acting on-off valve 1 comprises an input port and an output port which are not visible in the representation according to FIG. 1. One of the ports, for instance the input port A indicated in broken lines, is located approximately in the plane of projection, while the other port, for instance the output port B, is located in a plane extending normally to the plane of projection. The fast-acting on-off valve 1 in a slide design includes a casing 2 having a valve sleeve 4 in which a plunger or valve actuator 6 is guided to be axially movable (in vertical direction in FIG. 1). The valve actuator 6 is operated by a magnet, which in the shown embodiment is a flat armature magnet 8 acting via a lever transmission 10 upon the valve actuator 6. The valve sleeve 4 is formed of a plurality of disks 12a, 12b, 12c and 13a, 13b, 13c, wherein a sealing land 28 interacting with a control collar (see 72, 74 in FIGS. 1 and 44, 46, 48 in FIG. 3) of the valve actuator 6 is formed on each of the disks 12, 13. The individual disks 12, 13 have an identical structure and are inserted in the casing 2 being merely offset by 90° with respect to each other. Details of the sleeve 4 composed of a plurality of disks 12, 13 will be described hereinafter by way of FIGS. 2 and 3.

Figure 2A:
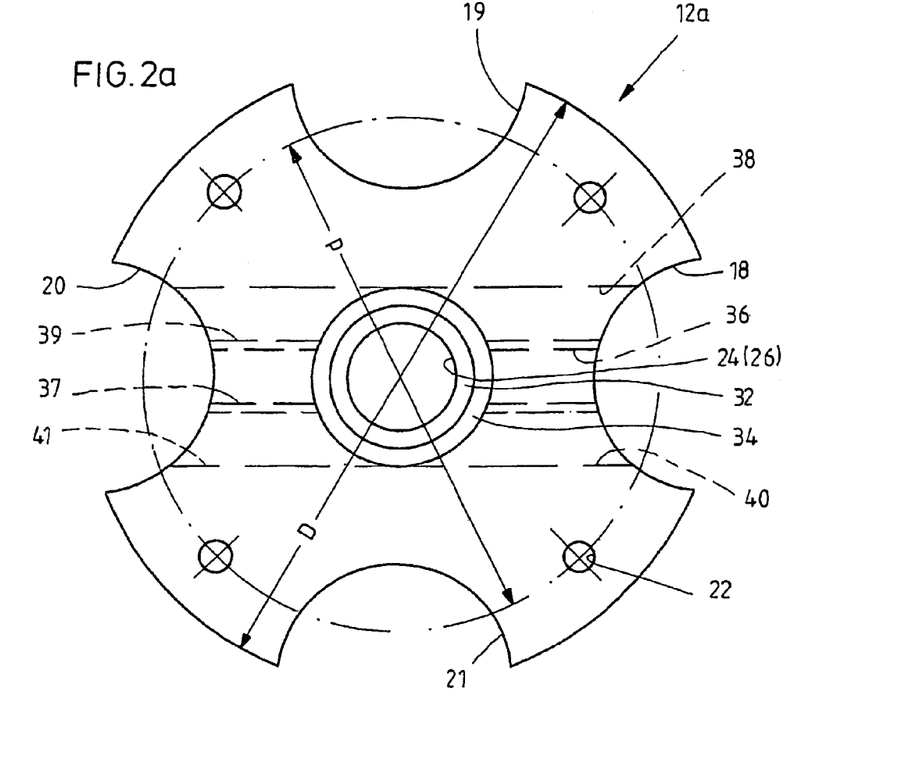
FIG. 2 is a front view and a cut top view of a disk of the fast-acting on-off valve from FIG. 1.
Figure 2B:
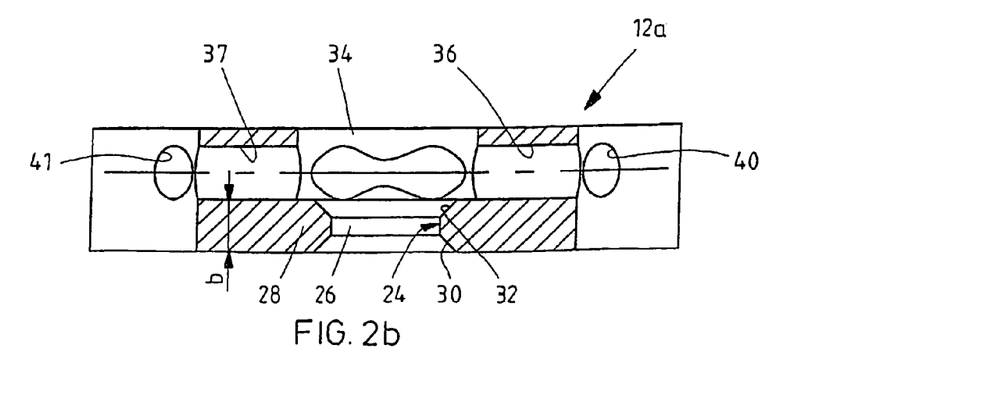

FIG. 2a is a view corresponding to that onto the disks 12a, 12b and 12c in FIG. 1. FIG. 2b shows a front view onto said disks. As all disks 12, 13 basically have the same structure, merely the structure of the disk 12a is explained by way of FIG. 2. In the front view said disk has a circular large surface of the outer diameter D. Offset by 90° with respect to each other four recesses 18, 19, 20, 21 are formed at the outer circumference of the disk 12a which are approximately semi-circular in the front view (FIG. 2a). On a common pitch diameter d four fastening bores 22 offset with respect to the recesses 18, 19, 20, 21 are formed through which locking screws of the valve sleeve 4 extend. In the center of the disk 12a a disk bore 24 is provided whose circumferential surface visible in FIG. 2b constitutes a sealing face 26 of a sealing land 28. The circumferential sealing face 26 of the sealing land 28 is transformed into two inclined surfaces 30, 32 arranged obliquely with respect thereto which are by far more distinct than the conventional chamfers. The width b of the sealing land 28 is comparatively small. Without said inclined surfaces 30, 32 the sealing land 28 would deform such that in the case of greater differences in pressure this results in sticking of the valve actuator 6. It turned out that a lateral bending is prevented by these inclined surfaces 30, 32 and even a better centering of the valve actuator 6 is made possible. The configuration of the sealing land 28 with the two inclined surfaces 30, 32 is the subject matter of a further patent application deposited in parallel—as mentioned before.

As one can take from the cut top view shown in FIG. 2b, the disk bore 24 is expanded into a disk chamber 34 subsequent to the inclined surface 32. In accordance with the front view arranged in FIG. 2a, pressure medium conduits 36, 37, 38, 39, 40, 41 open into said disk chamber 34, wherein each of the pressure medium conduits 36, 37; 40, 41 and 38, 39 form a coaxially arranged pair and open on both sides into the disk chamber 34. The other end portion of the conduits 36, 38, 40 opens in the circumferential edge of the recess 18, the other end portion of the three further pressure medium conduits 37, 39, 41 opens in the recess 20 arranged diametrically thereto. As can be taken from FIG. 2, the pair of pressure medium conduits 36, 38 is disposed in a diagonal of the disk 12a, the two other pressure medium pairs 38, 39; 40, 41 are offset in parallel thereto.

In the sectional view according to FIG. 2b merely the two diagonally extending pressure medium conduits 36, 37 and 40, 41 are visible, wherein the two latter conduits 40, 41 are confluent in the opening area of the pressure chamber 34.

As mentioned in the foregoing, respective adjacent disks 12, 13 are disposed offset by 90° with respect to each other. I.e. in the representation according to FIG. 1 the disks 12a, 12b, 12c are provided in the mounting position shown in FIG. 2b, while the adjacent disks 13a, 13b, 13c are arranged offset by 90° with respect thereto so that the axes of the pressure medium conduits 36 to 41 extend normally to the plane of projection, whereas in the case of the other disks 12a, 12b, 12c they are arranged in parallel to the plane of projection.

Figure 3:
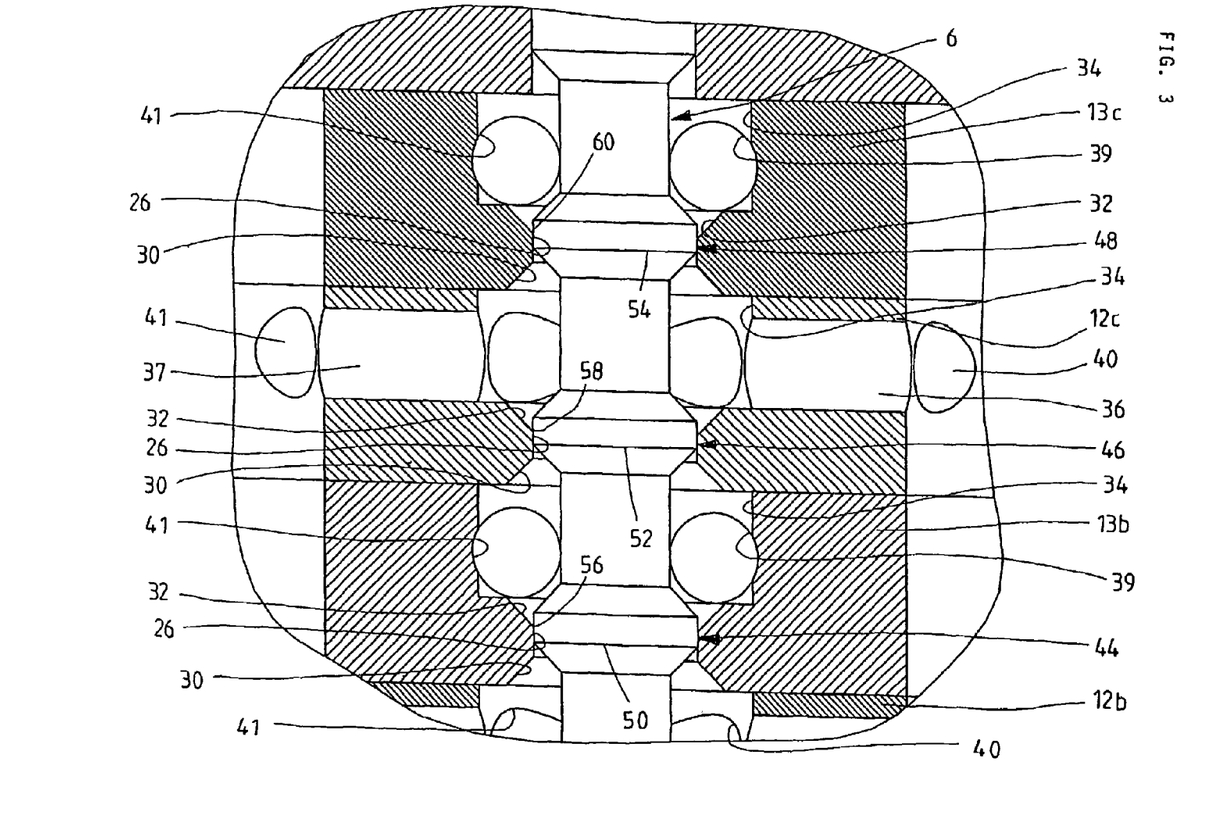
FIG. 3 is a detailed view of the fast-acting on-off valve from FIG. 1.

On the assumption that the disks 13a, 13b, 13c are rotated clockwise by 90° with respect to the disks 12a, 12b, 12c, in the representations according to FIGS. 1 and 3 the opening cross-sections of the pressure medium conduits 39, 41 into the disk chambers 34 of the disks 13a, 13b, 13c are seen.

According to FIG. 1, the valve actuator 6 includes five control collars the control collars 44, 46, 48 of which are visible in FIG. 3. In the shown base position they are designed to have a positive overlap with respect to the sealing faces 26 of the sealing lands 28. The end faces of the control collars 44, 46, 48 are beveled, wherein respective control edges 50, 52, 54 are formed which interact with the circumferential edge of the sealing face 26 on top in FIG. 3—hereinafter referred to as case-fixed control edges 56, 58, 60.

In accordance with FIG. 1, two guiding collars 62, 64 are formed at the end portions of the valve actuator 6. An axial projection 66 which is operatively connected to the lever transmission 10 is linked to the upper guiding collar 64 at the top in FIG. 1.

As one can take especially from FIG. 3, in the shown base position of the valve actuator 6 the control edges 50, 52, 54 and the corresponding control edges 68 marked in FIG. 1 of the control collars 72, 74 not shown in FIG. 3 are arranged approximately centrally with respect to the sealing face 26 so that the axial sealing length between the control collars 44, 46, 48, 72, 74 and the associated sealing faces 26 is about half the axial length of the sealing faces 26.

As one can take especially from FIG. 1, the four recesses 18, 20 evenly distributed along the circumference of the disks 12a, 12b, 12c as well as the recesses 19, 21 of the disks 13a, 13b, 13c mounted offset by 90° with respect thereto are in alignment so that four junction conduits extending axially in parallel to the valve axis are formed, the junction conduits 76, 78 of which are visible in FIG. 1, while the two other junction conduits offset by 90° with respect thereto are arranged above and below the plane of projection. The respective pressure medium conduits 36, 37, 38, 39, 40 of the disks 12a, 12b, 12c open in the represented junction conduits 76, 78, while the respective pressure medium conduits of the disks 13a, 13b, 13c arranged offset by 90° open in the non-visible junction conduits.

Figures 4A, 4B:
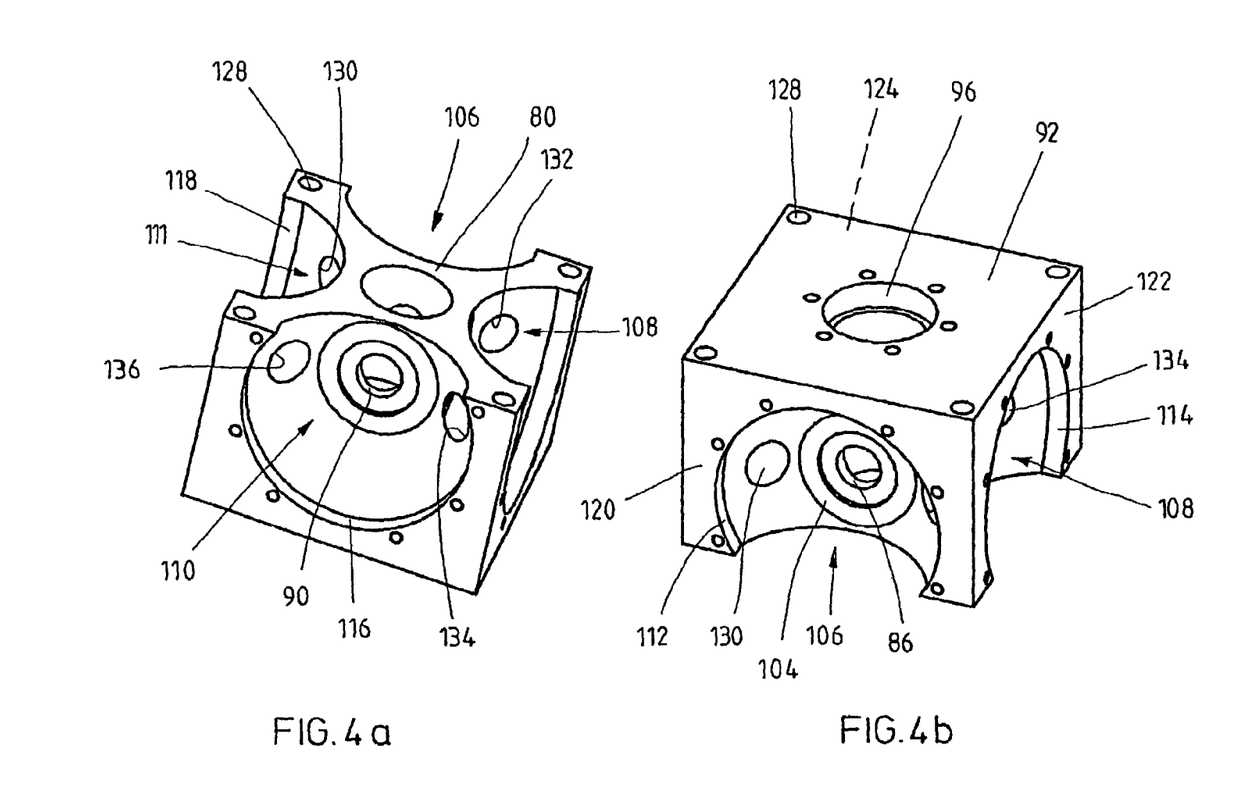
FIG. 4 shows three-dimensional views of a valve casing of the fast-acting on-off valve from FIG. 1.
Figure 5A:
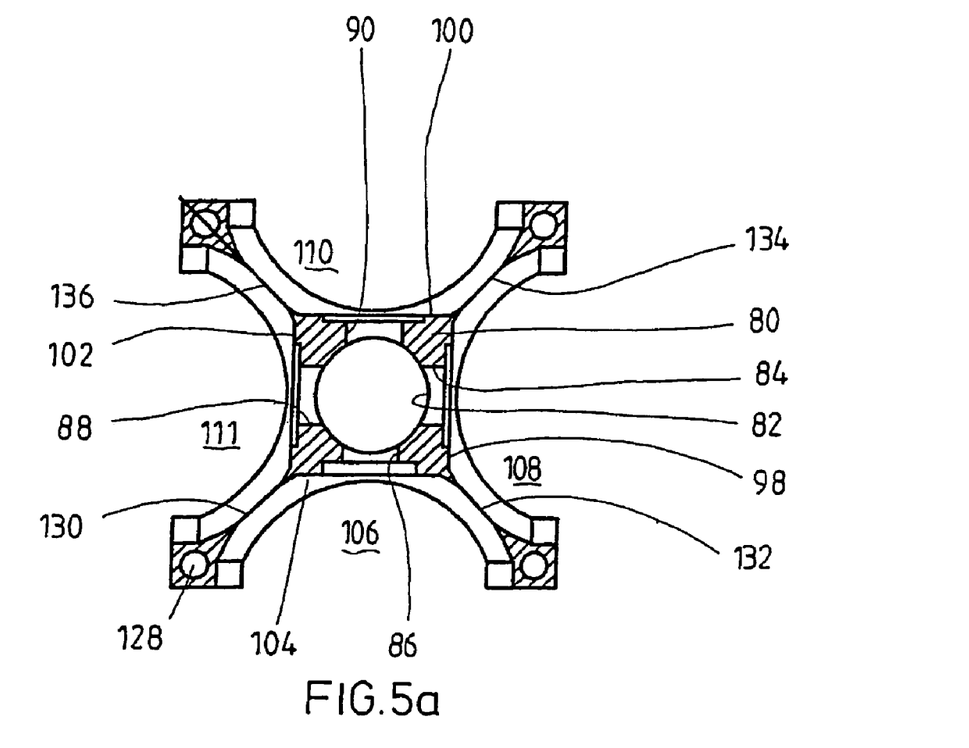
FIG. 5 shows sectional views of the valve housing from FIG. 4.
Figure 5B:
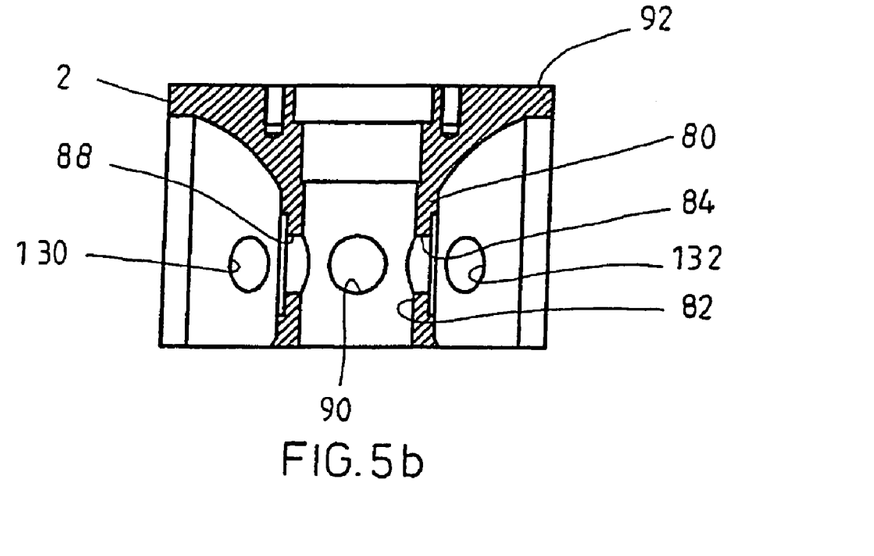

As can be inferred from FIG. 1, the disks 12, 13 are inserted in a mounting bush 80 which is formed integrally at the casing 2. The structure of the casing is illustrated in detail hereinafter by way of FIGS. 4 and 5. FIG. 4b is a top view (FIG. 1) onto the valve housing and FIG. 4a shows a bottom view onto the valve casing 2. FIG. 5a shows a horizontal section across the casing in the representation according to FIG. 4b and in FIG. 5b a vertical section across the casing 2 corresponding to the sectional view of FIG. 1 is shown.

The diameter of an inner circumferential wall 82 (see FIG. 5b) of the mounting bush 80 substantially corresponds to the outer diameter D of the disks 12, 13. As one can take especially from the horizontal section shown in FIG. 5a, four radial connecting bores 84, 86, 88, 90 offset by 90° with respect to each other pass through the wall of the mounting bush 80, wherein according to FIG. 1 the connecting bores 84, 88 open into the junction conduits 78 and 76 formed by the disks and the other two connecting bores 86, 90 extending normally thereto open into the two other junction conduits not shown in FIG. 1. It is assumed that a port of the on-off valve 1, for instance the input port A, is connected to the two junction conduits 78, 76, whereas the output port B is connected to the other junction conduits not represented which are formed by the disks 13. I.e. the disks are alternately connected to the working port A and the working port B, wherein pressure medium is supplied to the disk chambers 34 on both sides via the pressure medium conduits 36 to 41. The ports A, B are formed in a bottom plate 146 whose structure will be explained in detail by way of FIG. 6.

In accordance with the illustrations in FIGS. 1 and 5, the mounting bush 80 is transformed into a cover plate 92 which is clearly visible also on the right in FIG. 4. The flat armature magnet 8 is fastened on said cover plate by means of a fastening flange 94 immersing in a mounting hole 96 formed coaxially with respect to the mounting bush (see FIG. 4b) which is downwards stepped back.

As one can take in particular from FIGS. 4 and 5, the connecting bores are extended step-shaped toward end faces 98, 100, 102, 104 of mounting chambers 106, 108, 110, 111 of the housing 2. According to FIG. 4, the circumferential walls of these receiving chambers are curved in spherical segment shape and open via cylindrical surface sections 112, 114, 116, 118 (see FIG. 4b) into side faces 120, 122, 124 and 126 of the cube casing 2. According to FIG. 4, the mounting chambers 106, 108, 110, 111 are offset downwards vis-à-vis the cover plate 92 so that they extend into the bottom area, while the cover plate is not intersected by the mounting chambers 106, 108, 110, 111. This bottom area is visible in FIG. 4a. The bottom plate 146 (FIG. 6) is screwed onto said bottom area. The bottom of the casing 2 shown in FIG. 4 is formed by the central mounting bush 80 and the remaining casing walls forming a cross which extend to the corner areas of the casing in which respective fastening bores 128 extending over the entire height of the casing 2 are formed. As one can take especially from the horizontal section in FIG. 5a, the diameter of the spherical segment shaped mounting chambers 106, 108, 110, 111 is selected such that the circumferential walls of adjacent mounting chambers intersect so that four breakthroughs 130, 134, 136 and 138 are formed. By this design, on the one hand, the weight of the casing 2 is minimized and, on the other hand, the mounting chambers serve for mounting, completely or in portions, reservoirs or other component parts providing elasticity which contribute to preventing pressure pulsations and switching shocks and to reducing cavitation phenomena. These reservoirs can be connected in the pressure medium volume flow ahead of and/or behind the opening cross-sections of the on-off valve 1 and are communicated with the junction conduits 76, 78 via the connecting bores 84, 86, 88, 90.

The flat armature magnet is a commercial component part so that detailed descriptions can be dispensed with. As mentioned in the beginning, an armature plate 174 of the flat armature magnet 8 is operatively connected via the lever transmission 10 to the axial projection 66 of the valve actuator 6.

In the embodiment shown in FIG. 1 the lever transmission 10 consists of plural—for instance four—levers 166, 167 which are linked to the armature plate 174 by tension rods 172 indicated by dot-dash lines. The tension rods 172 have heads 173 immersing in corresponding pockets 176 of a spacer plate 158 forming the end stop of the valve sleeve 4. The levers 166, 167 are seated with their radially outer end sections on the one hand on an annular shoulder 168 of the spacer plate 158, wherein the annular shoulder is delimited in radial direction by a spacer sleeve 175. The levers 166, 167 are clamped between the annular shoulder of the spacer plate 158 and a shoulder of the spacer sleeve 175 extending in parallel thereto so that they protrude freely in radial direction. A reset spring 180 which is connected to the axial projection 66 of the valve actuator 6 is supported on a radially protruding shoulder of said spacer sleeve 175. The armature plate 174 is arranged by forming a small gap with respect to the not represented flat armature of the flat armature magnet 8.

The end portions of the levers 166, 167 grasp behind a collar 164 disposed at the end of the axial projection 66 upon which the reset spring 180 acts. In the shown embodiment said reset spring is a spiral spring.

If current is supplied to the flat armature magnet 8, in the representation according to FIG. 1 the armature plate 174 moves upwards and the tension rods 172 deflect the levers 166 that are laterally supported at the casing cover 170 so that the stroke of the valve actuator 6 is transmitted according to the lever principle, wherein the transmission ratio corresponds to the ratio between the distance of the bearing face of the levers 166 on the spacer sleeve 175 and the spacer plate 158 and the point of action at the valve actuator 6 as well as the distance of the tension rods 172 from the above-mentioned bearing face of the levers 166. When switching dead the armature plate 174 returns and the levers 166 spring back to the shown home position. The reset motion of the valve actuator 6 is assisted by the reset spring 180.

It is assumed that a high supply pressure is applied to the working port A and thus to the two connecting bores 84, 88, while low pressure or tank pressure is applied to the two other connecting bores 86, 90. Accordingly, when the on-off valve 1 is closed the higher supply pressure is also applied to the disk chambers 34 of the disks 12a, 12b, 12c, whereas the tank pressure is prevailing in the disk chambers 34 of the disks 13a, 13b, 13c. The pressure chambers subjected to different pressures are blocked against one another by the control collars 44, 46, 48, 72, 74 which are tightly adjacent to the circumferential surfaces of the sealing faces 26 of the sealing lands 28. When current is supplied to the flat armature magnet 8, the motion of the flat armature is transmitted via the lever transmission 10 to the valve actuator 6 so that the latter is moved upwards in the representation according to FIG. 1. By the control edges 50, 52, 54, 68, 70 sectional opening cross-sections which are delimited by said control edges and by the case-fixed control edges 56, 58, 60 are then actuated to open. Said sectional opening cross-sections connect the respective adjacent disk chambers 34 to each other so that several pressure medium partial flows stream from the two junction conduits 76, 78 through the opened sectional opening cross-sections into the disk chambers of the disks 13a, 13b, 13c, from there via the pressure fluid conduits 36 to 41 into the not shown junction chambers (above or below the plane of projection in FIG. 1) and then, summed up, flow off or are combined into possibly connected reservoirs via the connecting bores 86, 90.

Due to the very small diameter of the valve actuator (e.g. 6 mm) and the extremely small width B of the sealing lands 28, the valve can be switched with a very small stroke at extremely high speed so that extremely short switching times of e.g. 1 ms can be obtained in the case of a pressure medium volume flow of 75 l/min (with a pressure drop of 5 bar). Such on-off valves can be used for a plurality of safety functions as well as control functions such as, for instance, positioning tasks and, e.g., also in a switching hydraulic transformer.

Figure 6:
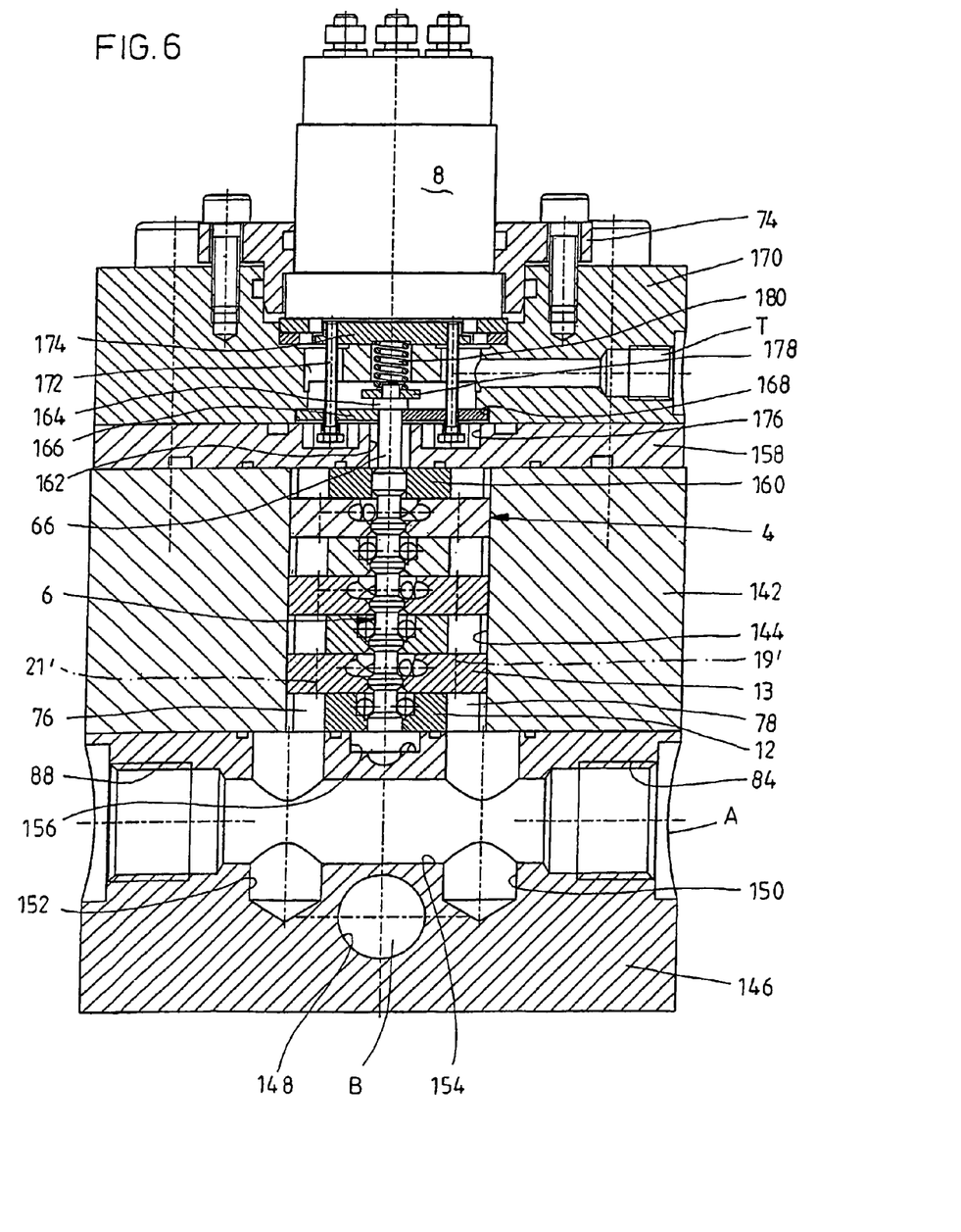
FIG. 6 is a sectional view of a further embodiment of a fast-acting on-off valve.

In FIG. 6 another embodiment of an on-off valve 1 according to the invention is described.

In contrast to the afore-described embodiment, in the design shown in FIG. 6 a different casing structure and a somewhat different lever transmission for the flat armature magnet 8 are used. The structure of the valve sleeve 4 composed of plural disks 12, 13 is substantially identical with the above-described embodiment, wherein the disks 13 are not formed to include the recesses 19, 21. They are orientated transversely to the axis of the pressure medium conduits 36 to 41. Instead of the recesses, breakthroughs 19', 21' indicated in dot-dash lines which assume the function of the recesses 19, 20 are provided in the disks 13. The section according to FIG. 6 thus extends up to the outer circumferential edge of the disks 13.

In the embodiment shown in FIG. 6 the valve sleeve 4 is held in a casing bush 142 which is closed at the base by a bottom plate 146 in which the ports A and B of the fast-acting on-off valve 1 are formed. Both ports A, B are double ports for the supply of pressure medium on both sides and are connected to branching areas of an input line and an output line. The port A is connected in a hydraulic manner to two connecting bores 84, 88 which are arranged diametrally with respect to each other and are communicated via an input conduit 148. Said input conduit 148 extending transversely to the valve axis is intersected by two blind bores 150, 152 opening into the two junction conduits 76, 78 of the valve sleeve 4.

Said junction conduits 76, 78 are then communicated, for instance, with the pressure medium conduits 36 to 41 of the disks 13. Accordingly, the disks 12 are connected to the port B in a hydraulic manner. The double ports of the latter are located above and below the plane of projection, wherein in the section according to FIG. 6 merely the junction conduit 154 is visible between the two not represented connecting bores. I.e. said junction conduit 154 extends offset by 90° below (FIG. 6) the junction conduit 148 and opens on both sides into said connecting bores. The connection to the two junction conduits not visible in FIG. 6 and formed by the disks 12, 13 is again provided by respective blind bores 150, 152 arranged above and below the plane of projection. That is to say, the ducting for the double port B is carried out in the same way as for the double port A with the only difference that the conduits are arranged offset by 90° with respect to each other. Such a bottom plate 146 is also placed onto the casing in the embodiment according to FIG. 1.

In the end face of the bottom plate 146 facing the casing bush 142 furthermore a hollow 156 is provided which is delimited in portions by the end face of the valve actuator 6. Said end face is relieved toward a tank port.

The head-sided end of the housing bush 142 is formed by a spacer plate 158, wherein a spacer disk 160 is provided between the latter and the adjacent disk 13 so that the disks 12, 13 are pressed against each other in a sealing manner. The spacer plate 158 includes a breakthrough through which the axial projection 66 of the valve actuator 6 extends. In the shown embodiment the axial projection 66 has a collar 164 on which the levers 166 are supported. They act upon the axial projection 66 and are adjacent from the bottom (view according to FIG. 6) to the end face of the collar 164 and are supported by their radially outer portions in an annular recess 168 of a casing cover 170. The levers 166 include a breakthrough through which a respective tension rod 172 extends which, one the one hand, is connected to the armature plate 174 of the flat armature magnet 8 and, on the other hand, acts upon the lower side (FIG. 6) of the levers 166. These portions of action of the tension rods 172 immerse in pockets 176 in the upper end face of the spacer plate 158 in the shown embodiment.

A spring plate 178 upon which a reset spring 180 acts which in this embodiment is in the form of a spiral spring and is supported on the flat armature 174 is supported at the upper side of the collar 164.

The spring chamber for the reset spring 180 and the upper end face of the valve actuator 6 are in turn relieved toward a tank T or toward a low-pressure port. The flat armature magnet 8 is fastened in the same way as in the afore-described embodiment by means of a mounting flange 74.

An on-off valve is disclosed, especially a fast-acting on-off valve, wherein a plunger is pretensioned in a base position. The plunger has a plurality of parallel control edges via which a plurality of sectional opening cross-sections, arranged in parallel in a hydraulic manner, can be jointly actuated to open or close when the valve is switched.

LIST OF REFERENCE NUMERALS

1 Fast-acting on-off valve
2 casing
4 valve sleeve
6 valve actuator
8 flat armature magnet
10 lever transmission
12 disk
13 disk
16 control collar
18 recess
19 recess
19' breakthrough
20 recess
21 recess
21' breakthrough
22 fastening bore
24 disk bore
26 sealing face
28 sealing land
30 inclined surface
32 inclined surface
34 disk chamber
36 pressure medium conduit
37 pressure medium conduit
38 pressure medium conduit
39 pressure medium conduit
40 pressure medium conduit
41 pressure medium conduit
44 control collar
46 control collar
48 control collar
50 control edge 52 control edge
54 control edge
56 case-fixed control edge
58 case-fixed control edge
60 case-fixed control edge
62 guiding collar
64 guiding collar
66 axial projection
68 control edge
70 control edge
72 control collar
74 control collar
76 junction conduit
78 junction conduit
80 mounting bush
82 inner circumferential wall
84 connecting bore
86 connecting bore
88 connecting bore
90 connecting bore
92 cover plate
94 fastening flange
96 mounting hole
98 end face
100 end face
102 end face
104 end face
106 mounting chamber
108 mounting chamber
110 mounting chamber
111 mounting chamber
112 cylinder face portion
114 cylinder face portion
116 cylinder face portion
118 cylinder face portion
120 side wall
122 side wall
124 side wall
126 side wall
128 fastening bore
130 breakthrough
134 breakthrough
136 breakthrough
138 breakthrough
142 casing bush
144 female bore
146 bottom plate
148 input conduit
150 blind bore
152 blind bore
154 junction conduit
156 hollow
158 spacer plate
160 spacer washer
162 breakthrough
164 collar
166 lever
167 lever
168 annular shoulder
170 casing cover
172 tension rod
173 head
174 armature plate
175 spacer sleeve
176 pocket
178 spring collar
180 reset spring

The invention claimed is:

1. An on-off valve comprising a plunger guided in a casing which is pretensioned in a base position and which can be switched electrically or hydraulically so as to block or open a connection between a first and a second port, wherein the plunger has a plurality of parallel control edges each of which delimits a sectional opening cross-section by a case-fixed control edge, and wherein said sectional opening cross-sections arranged in parallel in a hydraulic manner can be jointly actuated to open or close when the valve is switched, wherein the respective case-fixed control edges are formed at a circumferential sealing land of the casing, a valve sleeve of the casing is composed of a plurality of disks at each of which one of the sealing lands is formed and each of which includes at least one pressure medium conduit opening into a radially expanded disk chamber adjacent to the sealing land, and the pressure medium passages of adjacent disks are alternately connected to the first or second port in a hydraulic manner.

2. An on-off valve according to claim 1, wherein upstream of the sectional opening cross-sections the pressure medium volume flow is divided into sectional flows and downstream the latter are summed up.

3. An on-off valve according to claim 1, wherein the plunger is a valve actuator.

4. An on-off valve according to claim 1, wherein in a disk respective pressure medium conduits arranged coaxially with respect to each other form a pair of pressure medium conduits opening on both sides into the disk chamber.

5. An on-off valve according to claim 4, wherein three pairs of pressure medium conduits are provided which extend in parallel to the disk plane and one of which is arranged as a diagonal and two are arranged axially in parallel thereto.

6. An on-off valve according to claim 5, wherein the pressure medium conduits open into two diametrally disposed recesses.

7. An on-off valve according to claim 6, wherein the casing has a mounting bush for the disks with radial connecting bores passing through the shell thereof, each of said connecting bores being connected to one of the ports in a hydraulic manner and opening into one of the junction conduits.

8. An on-off valve according to claim 7, wherein the connecting bores are intersecting diagonal bores.

9. An on-off valve according to claim 7, wherein radially outside the connecting bores mounting chambers are formed for reservoirs or the like in the casing.

10. An on-off valve according to claim 1, wherein the disks have a substantially circular outer circumference, wherein four recesses offset by 90° with respect to one another are provided and the pressure medium conduit opens into at least one of the recesses, and wherein in the fitting position said recesses form a respective junction conduit between the pressure medium conduits and the ports.

11. An on-off valve according to claim 10, wherein each second disk of the disk sleeve is arranged offset by 90° with respect to the adjacent disk.

12. An on-off valve according to claim 10, wherein the ports are formed in a bottom plate of the casing and are connected to the junction conduits by means of angular bores.

13. An on-off valve according to claim 1, wherein the sealing lands are provided with circumferential inclined surfaces on both sides.

14. An on-off valve according to claim 1, wherein the plunger can be actuated via a solenoid.

15. An on-off valve according to claim 14, wherein the switching stroke of an armature of the solenoid can be transmitted to the plunger by means of a lever transmission.

16. An on-off valve according to claim 15, wherein the solenoid has a flat armature design and the lever transmission is a solid-state joint.

* * * * *